(12) United States Patent
Boudouris et al.

(10) Patent No.: US 11,084,912 B2
(45) Date of Patent: Aug. 10, 2021

(54) RADICAL POLYMER FILM WITH HIGH ELECTRICAL CONDUCTIVITY

(71) Applicant: Purdue Research Foundation, West Lafayette, IN (US)

(72) Inventors: Bryan W Boudouris, West Lafayette, IN (US); Brett M. Savoie, West Lafayette, IN (US); Varad Agarkar, West Lafayette, IN (US); Yongho Joo, West Lafayette, IN (US); Seunghyun Sung, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/384,143

(22) Filed: Apr. 15, 2019

(65) Prior Publication Data

US 2020/0032015 A1    Jan. 30, 2020

Related U.S. Application Data

(60) Provisional application No. 62/702,377, filed on Jul. 24, 2018.

(51) Int. Cl.
  *C09D 5/24* (2006.01)
  *C08J 5/18* (2006.01)

(52) U.S. Cl.
  CPC ............ *C08J 5/18* (2013.01); *C08J 2373/00* (2013.01)

(58) Field of Classification Search
  CPC ............ C08J 2373/00; C08J 5/18; C09D 5/24
  See application file for complete search history.

(56) References Cited

U.S. PATENT DOCUMENTS

| 2006/0269664 A1* | 11/2006 | Gleason | B05D 1/60 427/248.1 |
| 2015/0179353 A1* | 6/2015 | Suzuka | H01G 9/2031 136/263 |

OTHER PUBLICATIONS

Osawa et al. ("Effects of molecular weight on the electrical properties of electrochemically synthesized poly(3-hexylthiophene," Polymer, 1992, vol. 33, No. 5, pp. 914-919). (Year: 1992).*
Joo et al., "A nonconjugated radical polymer glass with high electrical conductivity," Science, vol. 359, pp. 1391-1395 (Year: 2018).*
G. Safoula et al., "Study of the Evolution of the Conductivity of Iodine-Doped Poly(n-Vinylcarbazole) as a function of annealing treatment," Journal of Applied Polymer Science, vol. 60, 1733-1739 (1996). (Year: 1996).*
Baradwaj et al. ("On the Environmental and Electrical Bias Stability of Radical Polymer Conductors in the Solid State," Macromol. Chem, Phys. 2016, 217, 477-484) (Year: 2016).*
Joo, Y et al., A nonconjugated radical polymer glass with high electrical conductivity, Science, 359, 1391-1395 (2018).

* cited by examiner

*Primary Examiner* — Frank J Vineis
*Assistant Examiner* — Nicole T Gugliotta
(74) *Attorney, Agent, or Firm* — Purdue Research Foundation; Zhigang Rao

(57) ABSTRACT

The present disclosure relates to a novel non-conjugated radical polymer film with high electrical conductivity, and methods of making and using the novel non-conjugated radical polymer film.

8 Claims, 5 Drawing Sheets

RADICAL POLYMER FILM WITH HIGH ELECTRICAL CONDUCTIVITY

CROSS-REFERENCE TO RELATED APPLICATION

This application claims the benefits of U.S. Provisional Application Ser. No. 62/702,377, filed Jul. 24, 2018 the contents of which are incorporated herein entirely.

GOVERNMENT SUPPORT CLAUSE

This invention wad made with government support under the award No. 1554957 awarded by the National Science Foundation (NSF) and the award No. FA9550-15-1-0449 awarded by the Air Force Office of Scientific Research (AFOSR). The Government has certain rights in the invention.

STATEMENT REGARDING PRIOR DISCLOSURES BY THE INVENTORS OR JOINT INVENTORS UNDER 37 C.F.R. 1.77(b)(6)

The inventors or joint inventors of the present disclosure, Yongho Joo, Varad Agarkar, Seung Hyun Sung, Brett M Savoie, and Bryan W Boudouris, publicly disclosed information related to the present disclosure in article Joo et al., A nonconjugated radical polymer glass with high electrical conductivity, *Science*, 359, 1391-1395 (2018). The article was published on Mar. 23, 2018, which is less than one year from the filing date of the U.S. Provisional Application Ser. No. 62/702,377, filed Jul. 24, 2018. A copy of a print out of the article is provided on a concurrently filed Information Disclosure Statement (IDS).

TECHNICAL FIELD

The present disclosure relates to a novel non-conjugated radical polymer film with high electrical conductivity, and methods of making and using the novel non-conjugated radical polymer film.

BACKGROUND

This section introduces aspects that may help facilitate a better understanding of the disclosure. Accordingly, these statements are to be read in this light and are not to be understood as admissions about what is or is not prior art.

Conducting polymers have relied on conjugated macromolecular backbones that are subsequently chemically-doped to achieve high electrical conductivity values [e.g., poly(3,4-ethylene dioxythiophene) doped with poly(styrene sulfonate). Despite their impressive electrical conductivity values, certain aspects of these macromolecules are not ideal. First, for some applications, optical transparency at visible wavelengths can be difficult to achieve with extended conjugated backbones. Second, the syntheses of advanced conducting polymers can be quite complicated with low yields. Third, chemical doping can depend on processing and lead to performance variability, and the dopants can decrease the materials and device stability.

Charge-neutral macromolecules that achieve relatively high electrical conductivity values without doping could address some of these issues. Radical polymers with non-conjugated backbones and stable open-shell pendant groups can pass charge through a series of oxidation-reduction (redox) reactions between the pendant open-shell sites. Because of the high density of redox-active sites associated with these materials, they have had impact in myriad energy storage and energy conversion applications. However, the highest solid-state electrical conductivity value reported for radical polymers was ~$10^{-2}$ S m$^{-1}$.

Therefore, it is still desirable to develop novel non-conjugated radical polymer films that may provide higher solid-state electrical conductivity value.

SUMMARY

The present disclosure provides a novel non-conjugated radical polymer film with high electrical conductivity, and methods of making and using the novel non-conjugated radical polymer film.

In one embodiment, the present disclosure provides a non-conjugated radical polymer film, wherein the non-conjugated radical polymer has a chemical structure comprising a moiety of formula I:

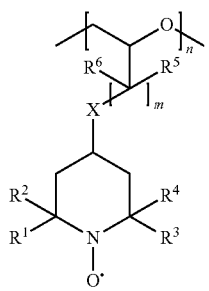

wherein $R^1$-$R^4$ are each independently H or $C_1$-$C_3$ alkyl;
$R^5$-$R^6$ are each independently H or $C_1$-$C_6$ alkyl;
X is N or O;
m is 1-3;
n is 10-5000; and
one or more hydrogen of formula I is optionally substituted with F, Cl, or Br,
wherein the non-conjugated radical polymer film as an electrical conductivity of 0.1-100.0 S·m$^{-1}$.

DETAILED DESCRIPTION

Figure 1:
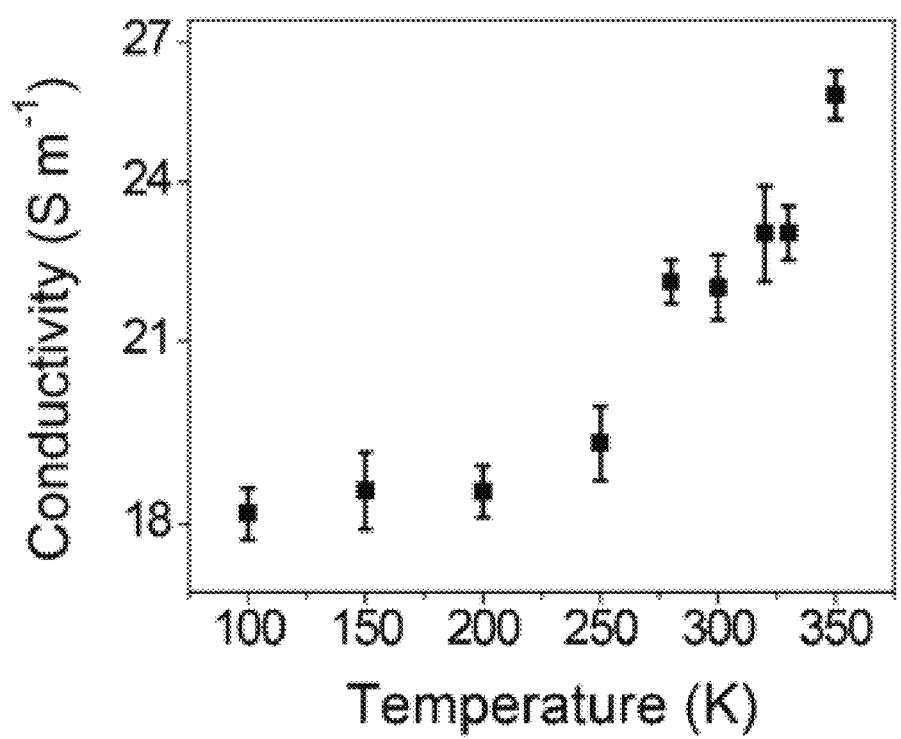
FIG. 1 relates to electrical conductivity as a function of temperature (100 K<T<350 K) for an annealed poly(4-glycidyloxy-2,2,6,6-tetramethylpiperidine-1-oxyl) (PTEO) film in a 0.5 μm channel. This annealing occurred at a temperature of 350 K for 2 hours in inert atmosphere, and it was performed prior to electrical characterization.

For the purposes of promoting an understanding of the principles of the present disclosure, reference will now be made to the embodiments. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

Despite the low reported conductivity values, the redox reactions that allow for charge exchange between the pendant groups are rapid, so high conductivities may be possible with appropriate molecular engineering of charge-transporting sites. A novel polymer film of poly(4-glycidyloxy-2,2,6,6-tetramethylpiperidine-1-oxyl) (PTEO) was prepared by using a ring-opening polymerization methodology, which allowed all of the radical sites in the monomer to be conserved in the polymer. Given its flexible macromolecular backbone and a near room-temperature glass transition temperature, $T_g$, its flow temperature is well below the degradation temperature of the macromolecule. Interestingly, the polymer by itself, as synthesized and even processed into a film, does not have remarkable electrical conductivity. However, thermal annealing of the radical polymer thin film may have resulted in the formation of percolating networks of radical sites in the solid state that were in electronic communication with one another. This network formation occurred despite the amorphous nature of the polymer thin film. The PTEO polymer film treated with thermal annealing provided an unexpectedly >1,000-fold increase in the electrical conductivity. An ultimate conductivity of ~20 S m$^{-1}$ is comparable to commercially-available, chemically-doped conducting polymers.

In one embodiment, the present disclosure provides a non-conjugated radical polymer film, wherein the non-conjugated radical polymer has a chemical structure comprising a moiety of formula I:

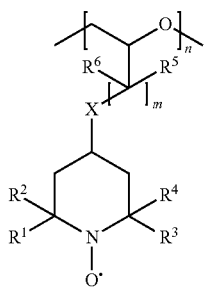

I wherein $R^1$-$R^4$ are each independently H or $C_1$-$C_3$ alkyl; $R^5$-$R^6$ are each independently H or $C_1$-$C_6$ alkyl; X is N or O;
m is 1-3;
n is 10-5000; and
one or more hydrogen of formula I is optionally substituted with F, Cl, or Br,
wherein the non-conjugated radical polymer film as an electrical conductivity of 0.1-100.0 S·m$^{-1}$.

In one embodiment, the present disclosure provides a non-conjugated radical polymer film, wherein the non-conjugated radical polymer has a chemical structure comprising a moiety of formula I, wherein the non-conjugated radical polymer film has a thickness of 0.01-100.0 μm, and the non-conjugated radical polymer film has an electrical conductivity of 0.1-100.0 S·m$^{-1}$. In one aspect, the non-conjugated radical polymer film has a thickness of about 0.01-75.0 μm, 0.01-50.0 μm, 0.01-25.0 μm, 0.01-1.0 μm, 0.01-0.9 μm, 0.01-0.8 μm, 0.01-0.7 μm, 0.01-0.6 μm, 0.01-0.5 μm, 0.1-100.0 μm, 0.1-75.0 μm, 0.1-50.0 μm, 0.1-25.0 μm, 0.1-1.0 μm, 0.1-0.9 μm, 0.1-0.8 μm, 0.1-0.7 μm, 0.1-0.6 μm, or 0.1-0.5 μm. A preferred thickness is about 0.1-0.6 μm. In one aspect, the non-conjugated radical polymer film has an electrical conductivity of 0.1-90.0 S·m$^{-1}$, 0.1-80.0 S·m$^{-1}$, 0.1-70.0 S·m$^{-1}$, 0.1-60.0 S·m$^{-1}$, 0.1-50.0 S·m$^{-1}$, 0.1-40.0 S·m$^{-1}$, 0.1-30.0 S·m$^{-1}$, 0.1-20.0 S·m$^{-1}$, 0.1-10.0 S·m$^{-1}$, 0.5-90.0 S·m$^{-1}$, 0.5-80.0 S·m$^{-1}$, 0.5-70.0 S·m$^{-1}$, 0.5-60.0 S·m$^{-1}$, 0.5-50.0 S·m$^{-1}$, 0.5-40.0 S·m$^{-1}$, 0.5-30.0 S·m$^{-1}$, 0.5-20.0 S·m$^{-1}$, or 0.5-10.0 S·m$^{-1}$.

In one embodiment, the present disclosure provides a non-conjugated radical polymer film, wherein the non-conjugated radical polymer has a chemical structure comprising a moiety of formula I, wherein $R^1$-$R^4$ are each independently methyl; $R^5$-$R^6$ are each independently H; X is O; m is 1-3; and n is 20-200, wherein the non-conjugated radical polymer film has a thickness of 0.1-1.0 μm, and the non-conjugated radical polymer film has an electrical conductivity of 0.5-30.0 S·m$^{-1}$.

In one embodiment, the present disclosure provides a method of making the non-conjugated radical polymer film of the present disclosure, wherein the method comprises: a) preparing a film of the non-conjugated radical polymer; and b) annealing the film prepared in step a) at a temperature that is capable of providing the film with electrical conductivity of 0.1-100.0 S·M$^{-1}$. In one aspect, the annealing is carried out at a temperature between 70-90° C. when the polymer is PTEO. In one aspect, the annealing is carried out at a temperature between 75-85° C. when the polymer is PTEO.

Experimental Sections

Materials and Methods: All chemicals were purchased from Sigma-Aldrich unless stated otherwise, and they were used without purification. The small molecule dopant, 4-acetamido 2,2,6,6-tetramethyl-1-oxopiperidinium tetrafluoroborate (TEMPOnium), was purchased from TCI America. The solvents, tetrahydrofuran (THF, Safe-Cote®) and hexane (HPLC grade), were obtained from Fischer Chemical. Sodium hydroxide (NaOH, analytical grade) was obtained from Macron Fine Chemicals.

General Methods $^1$H nuclear magnetic resonance (NMR) spectra were recorded at room temperature, on a Varian INOVA 300 MHz NMR spectrometer. The solutions contained ~1% (by weight) solids dissolved in deuterated chloroform. A Hewlett-Packard 1260 Infinity series having a Hewlett-Packard G1362A refractive index (RI) detector and three PLgel 5 μm MIXED-C columns was used for size exclusion chromatography (SEC). Polystyrene standards (Agilent Easi Cal) of molecular weight values that ranged from 1 kg mol$^{-1}$ to 200 kg mol$^{-1}$ were utilized to calibrate the SEC. The mobile phase was tetrahydrofuran (THF) at a temperature of 40° C.

and flowing at a rate of 1 mL min$^{-1}$. Ultraviolet-visible (UV-Vis) absorption spectroscopy experiments were conducted using a Cary 60 spectrometer. The solution UV-Vis absorption data were acquired with a PTEO concentration of 20 mg per 1 mL of chloroform. For the thin film UV-Vis transmission spectrum, a 1 µm-thick PTEO film was fabricated by spin-coating a PTEO-containing ink at 2,000 rpm for 60 s, resulting in the transparent film. The solution absorption and thin film transmission values were monitored between wavelengths of 200 nm≤λ≤800 nm. The amorphous morphology of the radical polymer was analyzed using wide-angle x-ray scattering (WAXS) in the scattering angle range of 5°≤2θ≤40° with Cu Kα radiation serving as the x-ray source. Differential scanning calorimetry (DSC) data were collected using a TA Instruments Q20 Series differential scanning calorimeter. The polymer sample was initially heated to 100° C., held isothermally for 5 min, and then cooled to −50° C. under a nitrogen gas purge. All of the heating and cooling ramps occurred at a rate of 10° C. min$^{-1}$. Then, the sample was subjected to the same procedure for a second heating and second cooling scan. The data shown are from the second scans of both heating and cooling. Thermogravimetric (TGA) analysis data were collected using a TA Instruments STD-Q600 TGA-DSC. For the degradation temperature analysis, the polymer sample was heated from room temperature to 1200° C. and cooled to room temperature at a scan rate of 10° C. min$^{-1}$ under air. For the thermal stability analysis, the sample was annealed at 80° C. for 2 hours under inert atmosphere. Afterwards, the sample was quickly heated to 1000° C. and held at this temperature for 15 minutes to completely decompose the polymer sample.

Electron paramagnetic resonance (EPR) spectroscopy experiments were completed using a Bruker EMX-EPR spectrometer. In solution EPR experiments, the PTEO was dissolved in chloroform and placed in the EPR tubes. Then, the tubes were allowed to equilibrate at the reported temperatures for 10 minutes prior to bringing the samples back to room temperature.

Then, the EPR data were collected at room temperature. Thin film EPR experiments were conducted on films that had been deposited within the EPR tubes. Then, the spectra were collected at the reported temperatures by adjusting the temperature of the sample in real-time while it was in the EPR spectrometer chamber (and allowing for thermal equilibration) using a variable temperature holder.

Synthesis of Poly(4-Glycidyloxy-2,2,6,6-Tetramethylpiperidine-1-Oxyl) (PTEO)

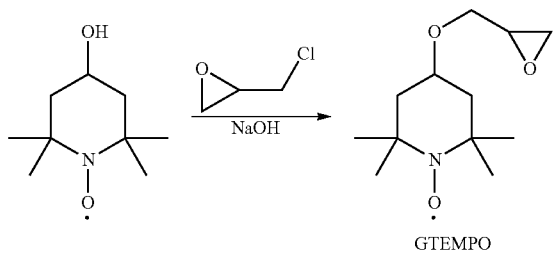

GTEMPO

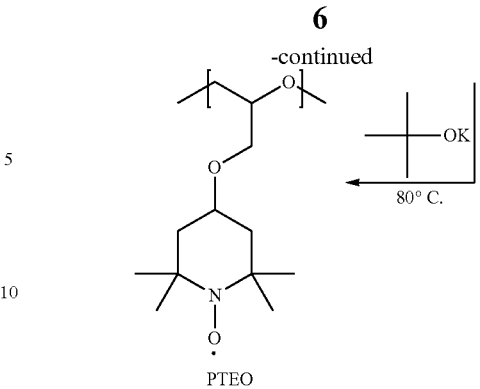

PTEO

Scheme 1: Synthesis of PTEO Radical Polymer (The Dot Next to O Represents a Radical)

The synthesis of PTEO radical polymer was illustrated in Scheme 1. Epichlorohydrin (10 mL, 120 mmol) and tetrabutylammonium hydrosulfate (1.5 g, 4.6 mmol) were added to an aqueous sodium hydroxide solution (16 mL of total volume, 50% NaOH, by weight), and the mixture was vigorously stirred for 10 minutes. A solution of 4-hydroxy-2,2,6,6-tetramethylpiperidin-N-oxy (4.12 g, 24 mmol) in tetrahydrofuran (30 mL) was then added dropwise into the mixture. The resulting solution was then vigorously stirred for 12 h at room temperature and poured into 200 mL of ice water. The reaction mixture was then extracted with ethyl acetate. The organic layer was washed with deionized water and then extracted with ethyl acetate again. The combined organic layers were then dried over anhydrous magnesium sulfate. The crude monomer product was obtained after removing the solvent by rotary evaporation. The monomer was purified by column chromatography using a silica gel column with hexanes and ethyl acetate (8:1, v/v) as the eluent. The product obtained was recrystallized from hexanes to yield the monomer as a red crystalline solid.

A mixture of GTEMPO (0.50 g, 2.2 mmol) and potassium tert-butoxide (10 mg, 0.09 mmol) were sealed in a glass tube inside a glove box. The reaction was then taken from the glove box, and heated at 80° C. for 2 h. After cooling to room temperature, dichloromethane was added to the reaction mixture, and the organic solution was washed with water. Then, the organic layer was poured into hexanes, and this produced an oily, viscous liquid. This viscous liquid was decanted to yield the crude polymer product. The viscous product was then dissolved in a small quantity of tetrahydrofuran, and the polymer was precipitated in hexanes. The polymer obtained was dried overnight in vacuum at room temperature. The number-average molecular weight ($M_n$) of PTEO was 2.4 kg mol$^{-1}$, with a dispersity value (Ð) of 1.75, as measured using size exclusion chromatography (SEC) against polystyrene standards.

PTEO Thin Film Coating, Optical Characterization, Device Fabrication, and Electronic Characterization The silicon dioxide (300 nm, thermally-grown) on silicon substrates (Silicon Valley Microelectronics Inc.) were cleaned with a piranha solution [H$_2$O$_2$ (33%, by volume) and concentrated H$_2$SO$_4$ (67%, by volume)] for 20 minutes and then rinsed with deionized water to remove any organic residues. After this treatment was performed, the substrates were baked on a hot plate at 100° C. for 60 s. With these cleaned substrates, high resolution positive poly(methyl methacrylate) (PMMA) (495 k A2 resist) was spun-coat at 3,000 rpm for 60 s to create an ~200 nm thick resist film. Next, electron-beam (e-beam) lithography (Raith e-Line, Raith GmbH) was used to define electrode dimensions that allowed for channel lengths of 0.2, 0.5, 0.6, 0.9, 1.0, 10, 20, and 50 μm. The exposure parameters were: energy: 20 keV, aperture: 20 μm, and area dose: 600 μC·cm$^{-2}$. For all of these geometries, the channel width was fixed at 1 mm. After the e-beam exposure, the residual photoresist was developed in MIBK:IPA (1:3) for 60 s, and the substrates were then rinsed with isopropanol. The developed substrates were dried under vacuum overnight. The e-beam lithography-generated substrates then were used to pattern electrodes through the thermal deposition of Ti (10 nm) and Au (50 nm) at the pressure of 5×10$^{-6}$ bar in order to create the bottom contact electrodes on the SiO$_2$ substrates. The PMMA was removed by ultrasonication in an acetone bath for 600 s. Following the electrode deposition, the PTEO radical polymer (50 mg) was dissolved in 1 mL of chloroform in order to form a pristine PTEO film. Moreover, for the mixed composite film of PTEO and TEMPOnium, the PTEO radical polymer (50 mg) was dissolved in 1 mL of DMF at 40° C. After the complete dissolution of PTEO, the TEMPOnium small molecule was dissolved in the PTEO solution at a concentration of 10% (by weight). Both the pristine radical polymer and mixed composite solution were spun-coat onto the substrate at 2,000 rpm for 60 s, yielding uniform films with a thicknesses of ~1 μm, as determined using a P7 profilometer (KLA-Tencor Corporation). Scanning electron microscopy (SEM) was used to image the fabricated substrates. This was done using a Raith SEM with a 5 keV accelerating voltage.

Current-voltage (I-V) measurements were acquired by sweeping voltages across the range of $-1\ V \leq V \leq +1\ V$ for device channel lengths of 0.2 μm, 0.5 μm, and 0.6 μm, and the voltage range of $-30\ V \leq V \leq +30\ V$ for channel lengths>0.6 μm. These data were recorded with the Lab Tracer software. This change in sweep range was performed in order to observe as large of a current as possible without approaching the breakdown field for either the polymer or the dielectric substrate. From these data, the electrical conductivity was calculated. These experiments were performed under vacuum in a PS-100 Lakeshore probe station with a Keithley 2400 source meter being used to control and record the I-V characteristics. The electrical conductivity variations that depended on the temperature were also characterized with Lakeshore probe station under vacuum condition over the temperature range 100 K<T<350 K. In order to reach a steady-state temperature value, the sample was left for 0.5 h at each temperature step before recording the I-V sweep. The temperature was controlled by the combination of liquid nitrogen and a temperature controller (Model 224, Lake Shore Cryotronics, Inc.). Some control experiments were performed in ambient conditions as well, and these occurred at room temperature. All other parameters remained the same as for the vacuum testing conditions.

Example 1

Thermal Annealed PTEO Film with Electrical Conductivity of up to 28 S·m$^{-1}$ at 80° C. Over Channel Lengths up to 0.6 Micrometers The PTEO radical polymer (50 mg) was dissolved in 1 mL of chloroform in order to form the conducting polymer ink. Then, the solution was spun-coat onto a silicon dioxide substrate (with patterned electrodes) at 2,000 rpm for about 60 seconds, yielding substantially uniform films with a thicknesses of about ~1 μm, as determined using a P7 profilometer (KLA-Tencor Corporation). The substrate and PTEO thin film were then placed on a hot plate set at 80° C. for 2 h in order to anneal the radical polymer. After 2 h, the sample was removed from the hot plate and allowed to cool to room temperature. The obtained PTEO film has electrical conductivity of up to 28 S·m$^{-1}$ at 80° C. over channel lengths up to 0.6 micrometers.

Binding Energy Calculation Procedures

All density functional theory (DFT) calculations were performed at the B3LYP/def2-TZVP (31) level with Grimme's D3 dispersion correction (32) as implemented in the Orca v3.0.3 (33). For all calculations involving pairs of TEMPO molecules, the wavefunction was converged to the broken symmetry biradical singlet state. All binding energies were corrected for basis-set superposition errors via the counterpoise correction. As a prerequisite for generating the binding energy curves, a single TEMPO molecule was first geometry-optimized at the DFT level, using an initial configuration that was generated from a universal force-field optimized initial guess. Convergence to a local minimum at the DFT level was confirmed by a frequency calculation.

To generate the geometries necessary for the binding curve calculations, the centroid of the optimized geometry was translated to the origin and aligned in the x-y plane. Specifically, the long axis of the TEMPO molecule (defined by the N-C vector bisecting the ring) was aligned with the y-axis, and the short axis (defined by the C-C vector orthogonal to the bisecting vector) was aligned with the x-axis. Specific binding curves were generated by duplicating the aligned molecule, performing specific rotations in integer multiples of 90° about the x/y/z axes, and displacing the duplicate from the origin along one of the Cartesian axes in steps of 0.2 Å up to a maximum centroid-centroid displacement of 15 Å. This procedure was completed by discarding any configurations with atomic separations of less than 1.5 Å between the molecules.

Due to the chair conformation of the TEMPO ring and methyl substitutions, the two faces of the ring are non-symmetric. Here, we refer to the less sterically crowded face as the "front" and the opposite face as the "back"; the face with the radical group is designated "head" and the opposite "tail". Due to the $\sigma_v$ symmetry element, both "edge" faces are equivalent. Taking all combinations of unique faces, 15 pair-wise orientations were generated. In addition, rotation of one of molecules about the displacement axis can generate additional orientations. In cases where the radical axes of both molecules are perpendicular to the displacement axis (i.e., the back-back, back-edge, back-front, edge-edge, edge-front, and front-front configurations) additional orientations were generated corresponding to parallel, anti-parallel, and orthogonal alignment of the radical groups (i.e., rotation by 0°, 90°, and 180° of one of the molecules about the displacement axis, respectively). The binding energy curves for the resulting 27 non-symmetric pair-wise orientations were characterized by counter-poise corrected single-point calculations.

As calculated, the binding energy curves represent an underestimation of the DFT interaction energy as the molecules can mutually relax and only centroid-aligned pairwise configurations have been investigated. To estimate the error due to these assumptions, we performed geometry optimizations of the most stable configurations from the three lowest energy binding curves and calculated counter-poise corrected binding energies for these optimized configurations. The optimized binding energies were between 0.1 kcal mol$^{-1}$ and 0.6 kcal mol$^{-1}$ more stable than the unrelaxed binding energies. This additional stabilization only reinforces the conclusions of the manuscript that TEMPO- TEMPO pairing interactions are well in excess of the thermal energy and capable of driving aggregation in the condensed phase.

Monte Carlo (MC) Simulations

Monte Carlo simulations were used to characterize the aggregation and percolation of TEMPO molecules within the polymer film. Given the strong orientational dependence of the TEMPO interactions, an anisotropic Hamiltonian was used to describe the pair-wise nearest neighbor interactions according to Equation S1.

$$H_{ij} = \begin{cases} E(v_T, v_i^0, v_i^1, v_j^0, v_j^1) & \text{if } \mathcal{O}(j) = 1 \\ 0 & \text{if } \mathcal{O}(j) = 0 \\ 0 & \text{if } i = j \end{cases} \quad \text{(Equation S1)}$$

In Equation S1, $\mathcal{O}(j)$ is one if the lattice-site is occupied and zero if it is unoccupied, $v_T$ is the vector defined by the difference between the lattice positions, $v^0$ is the long TEMPO axis, and $v^1$ is the short TEMPO axis. In the lattice-based model, $v^0$ and $v^1$ were constrained to be aligned with one of the lattice dimensions (i.e., each molecule could only adopt orientations that can be reached by series of 90° rotations about the Cartesian axes). $E(v_T, v_i^0, v_i^1, v_j^0, v_j^1)$ is an energy function that returns the orientationally-dependent interaction energy between the pairs as calculated by DFT. For given values of the $v_T$, $v^0$, and $v^1$ vectors, the pairwise interaction energy is taken as the minimum energy in the corresponding DFT binding curve (or curves in cases where multiple binding curves were calculated). A cubic lattice was used for the simulations, with a lattice spacing of 0.5 nm. This is qualitatively consistent with the observed minima in the binding curves (~5.5 Å for the most stable orientations) and the dimensions of the TEMPO moiety (~6.6 Å in the longest dimension, ~3.7 Å in the shortest).

The effect of the polymer was incorporated in three ways within the MC simulations. First, because TEMPO is attached to the polymer at the "tail" position, opposite the radical group, no TEMPO molecule was allowed to occupy a "tail" position relative to any other during the annealing process. Second, because the radical groups are covalently attached to the polymer, it should not be physically possible for the TEMPO density to fall beneath ~1 per nm$^{-3}$, based on the number density of typical polymers (0.8-0.9 atoms Å$^{-3}$). This constraint was implemented by rejecting any translation that resulted in a void in the lattice greater than three cubic lattice units (0.5 nm). Third, because PTEO has polarizable ether groups that can screen the dipole-dipole interactions between the radical groups, the interaction energies of non-nearest neighbor TEMPO groups were set to zero during the MC simulations.

Each annealing epoch consisted of attempting, for each occupied lattice site, (i) a translation to a neighboring site and (ii) a rotation of the TEMPO molecule within the lattice. In addition, random translation by one lattice unit was attempted on each contiguous cluster (i.e., network) of occupied lattice sites. In each epoch, cluster translations were attempted after the translations and rotations on the individual molecules and the order in which the various Monte Carlo moves were applied to individual molecules and clusters was randomized. Move acceptance was based on the standard Metropolis-Hastings criterion.

The percolation measure was calculated as the average of the x, y, and z spans for the largest network, where the span is the ratio of the maximum extent of the network in each direction to the lattice dimension. Results were averaged over 100 independent MC trajectories at each radical concentration and the reported error is the standard deviation of the percolation measure over the trajectories. The fragility analysis was performed on the fully annealed configurations (i.e., the configuration of each trajectory after 50,000 annealing epochs). At each defect density, results were averaged over 1000 trials on each of the 100 independent trajectories (i.e., 100,000 total defect insertions at each density of defects). Average values and standard deviations are reported over the 100 independent trajectories.

FIG. 1 demonstrated electrical conductivity as a function of temperature (100 K<T<350 K) for an annealed PTEO film in a 0.5 µm channel. This annealing occurred at a temperature of 350 K for 2 hours in vacuum, and it was performed prior to electrical characterization. The results showed that the annealed PTEO film has the electrical conductivity of about 18-28 S·m$^{-1}$, which is more than 1000 times higher than the electrical conductivity (about 0.01 S·m$^{-1}$) of currently known PTEO film. The electrical conductivity of the un-doped PTEO film of this disclosure has a comparable electrical conductivity with commercially available, chemically doped conducting polymers.

Figure 2:
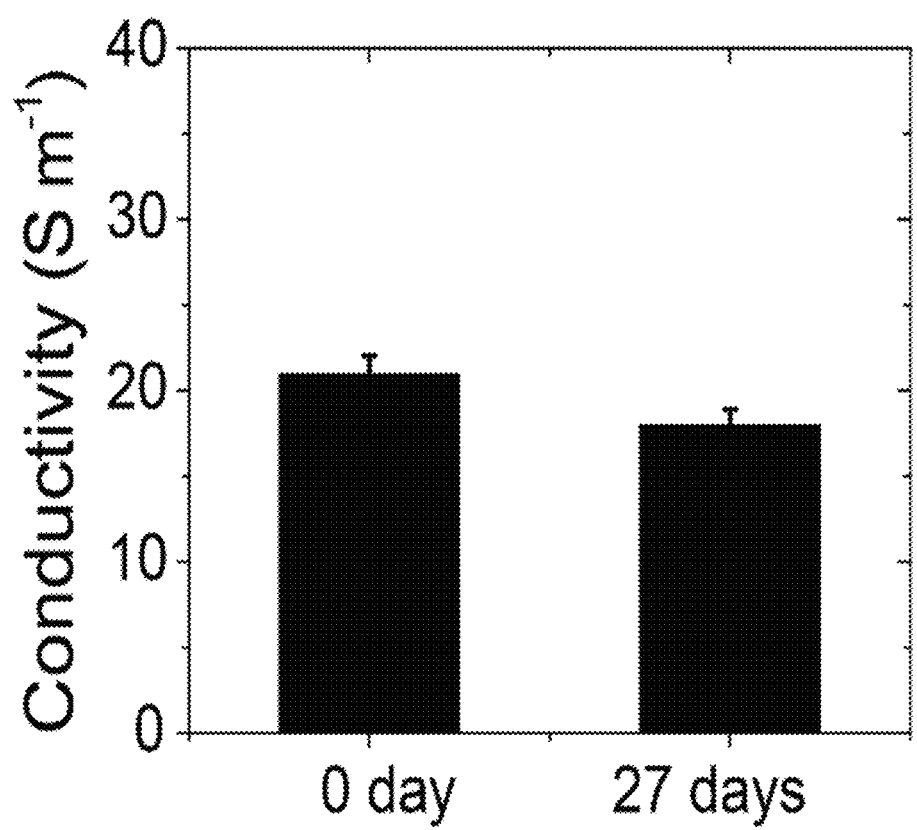
FIG. 2 relates to electrical conductivity of PTEO at two different points in time after device fabrication for a 0.5 μm channel length device. The electrical conductivity of the radical polymer thin film was maintained for over 3 weeks, showing the stability of the glassy polymer electrode.

FIG. 2 demonstrated electrical conductivity of PTEO at two different points in time after device fabrication for a 0.5 µm channel length device. The electrical conductivity of the radical polymer thin film was maintained for over 3 weeks, showing the stability of glassy polymer electrode.

Figure 3:
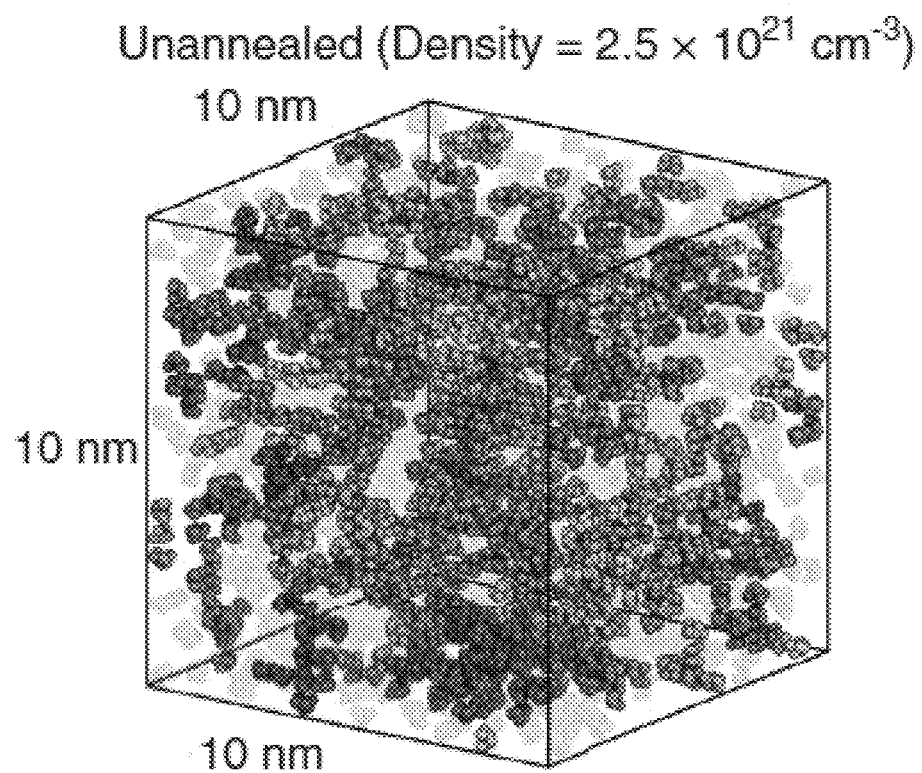
FIG. 3 relates to typical configurations for simulated unannealed films at a radical density of 2.5×10$^{21}$ cm$^{-3}$. Independent networks are drawn with different colors, and any networks composed of less than five molecules are rendered gray and transparent.
Figure 4:
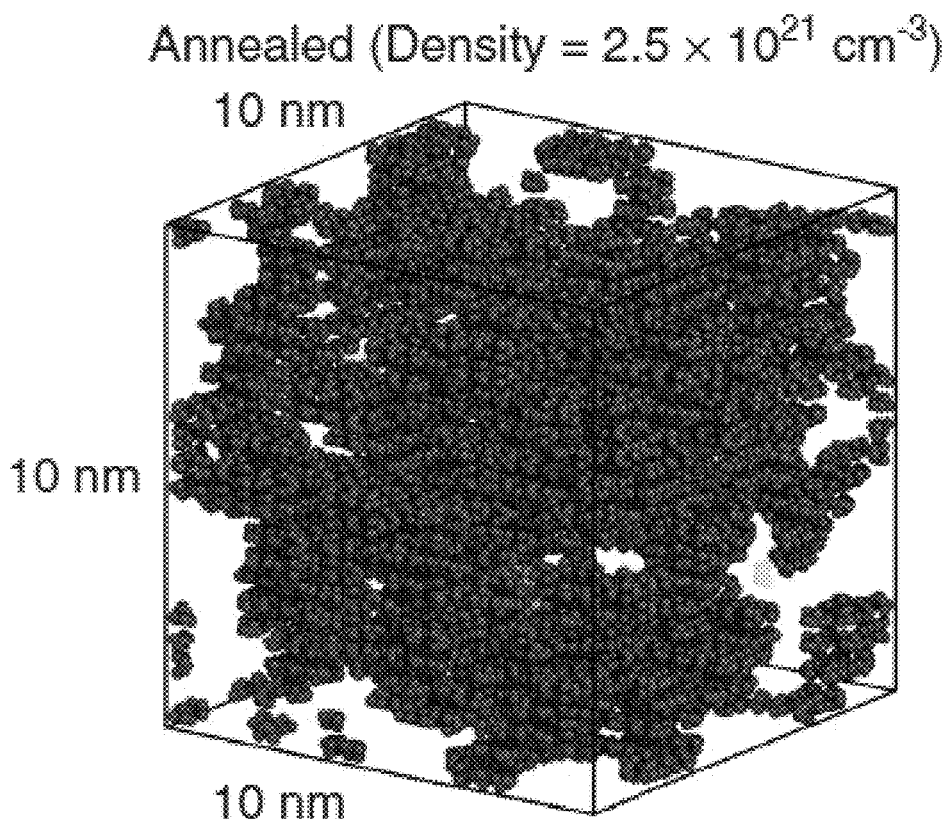
FIG. 4 relates to typical configurations for the simulated annealed films at a radical density of 2.5×10$^{21}$ cm$^{-3}$. Independent networks are drawn with different colors, and any networks composed of less than five molecules are rendered gray and transparent.

FIG. 3 demonstrated typical configurations for unannealed films at a radical density of 2.5×10$^{21}$ cm$^{-3}$. FIG. 4 demonstrated typical configurations for annealed films at a radical density of 2.5×10$^{21}$ cm$^{-3}$. The radical network formation in PTEO was modeled with Monte Carlo (MC) simulations of the annealing process using a Hamiltonian parameterized by DFT calculations and with an implicit treatment of the polymer. The configurations were then processed to characterize the radical networks and their degree of percolation ($\beta$) according to the following equation.

$$\beta = \frac{1}{3}(s_x + s_y + s_z) \quad \text{(Equation 1)}$$

Here, $s_i$ is the span of the largest network in each lattice dimension, with $\beta$ ranging from 0 (no percolation) to 1 (complete percolation across the lattice). The simulations revealed a dramatic effect of annealing on the percolation behavior at all radical densities. Random distributions of the radical groups (i.e., an amorphous as-cast film) did not form percolating networks. Only after annealing did discontinuous subnetworks (FIG. 3) combine through aggregation to form percolating networks (FIG. 4). Moreover, only above a critical radical density could percolating networks form at all.

Figure 5:
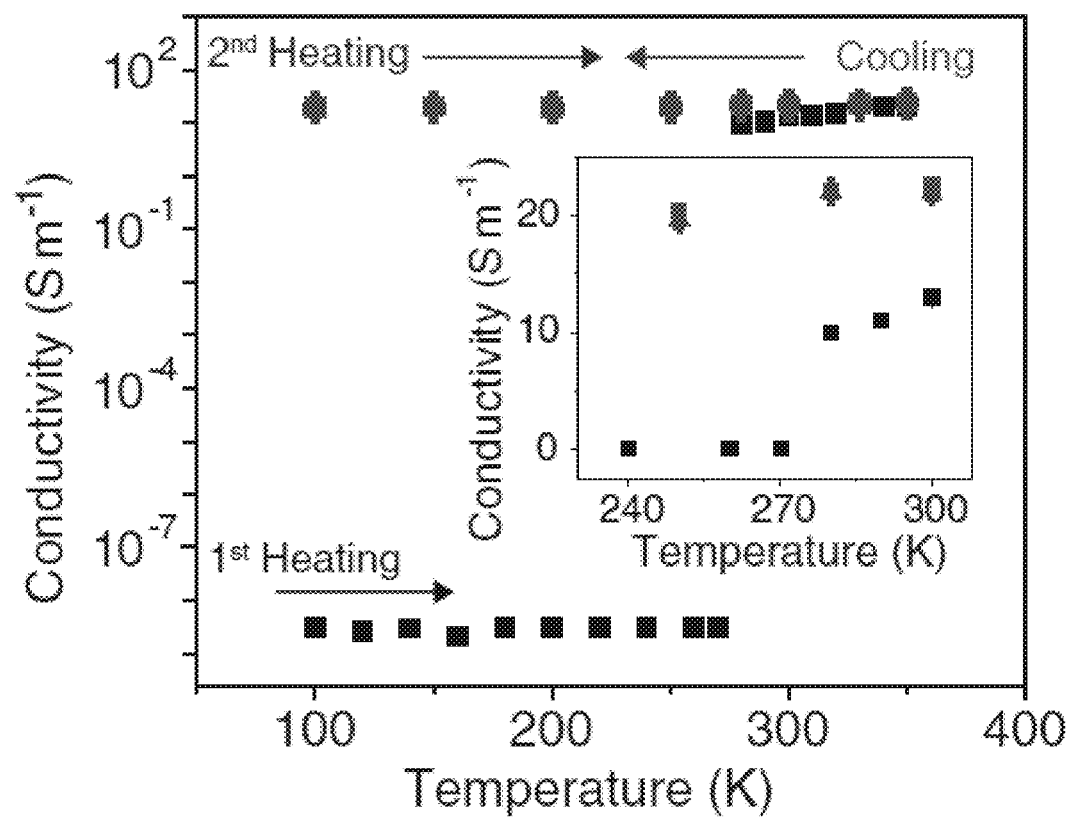
FIG. 5 relates to electrical conductivity as a function of temperature for PTEO in a 0.5-mm channel. Real-time annealing of the thin film allowed for local order to appear within the film so that the electrical conductivity was altered by 10 decades.

FIG. 5 relates to electrical conductivity as a function of temperature for PTEO in a 0.5-mm channel. Real-time annealing of the thin film allowed for local order to appear within the film so that the electrical conductivity was altered by 10 decades.

FIG. 5 demonstrates the transition for PTEO from the low charge transport regime (~10$^{-9}$ S m$^{-1}$) to the high charge transport regime (~10 S m$^{-1}$) in real time as the material crossed from the as-spin-coated glassy state (i.e., the thin film was cast at ~20° C.) into liquid-like molten state. In order to evaluate charge transport in this quenched state, the films were transferred to an inert atmosphere vacuum probe station and held at a temperature of 100 K. Heating of the sample occurred inside of the inert atmosphere vacuum probe station in order to capture the charge transport ability at low temperatures prior to bringing the PTEO thin films near $T_g$, so the changes in conductivity appear to be caused by changes in the nanoscale structure as opposed to changes in chemical oxidation. In these experiments, the sample was allowed to reach the desired temperature and held at that temperature for 30 minutes prior to collecting the electrical data. Then, the temperature of the sample was moved to the next temperature. Moreover, in a separate experiment, replicate devices were annealed at 80° C. for 2 hours in inert atmosphere conditions but without evaluating their low-temperature electrical properties (i.e., without the "1$^{st}$ Heating" scan in FIG. 5), and the conductivity of thin films processed in this manner began and remained at ~10 S m$^{-1}$ (i.e., in the same manner seen for the "2$^{nd}$ Heating" scan of FIG. 5), indicating that ordering was occurring though thermal annealing.

It should be noted that the unexpectedly high electrical conductivity of the annealed PTEO prepared in this disclosure was not enhanced by intentional doping. Further, the thin films of this material showed high optical transparency.

The non-conjugated radical polymer film of the present disclosure may be used for many industrial applications such as electromagnetic shielding, antistatic layers, lighting displays, touch sensors, smartphone touch screens and flat panel televisions.

Additional disclosure can be found in Appendix-A, B, filed herewith, entirety of which is incorporated herein by reference into the present disclosure.

Those skilled in the art will recognize that numerous modifications can be made to the specific implementations described above. The implementations should not be limited to the particular limitations described. Other implementations may be possible.

We claim:

1. A non-conjugated radical polymer film,
   wherein the non-conjugated radical polymer film has an electrical conductivity of 0.1-100.0 S·m$^{-1}$,
   wherein the non-conjugated radical polymer film is annealed and consists essentially of poly(4-glycidyloxy-2,2,6,6-tetramethylpiperidine-1-oxyl) (PTEO), and the polymer film has a thickness of 0.01-1.0 µm.

2. The non-conjugated radical polymer film of claim 1, wherein the non-conjugated radical polymer film has a thickness of 0.1-1.0 µm, and the non-conjugated radical polymer film has an electrical conductivity of 0.1-50.0 S·m$^{-1}$.

3. The non-conjugated radical polymer film of claim 1, wherein the non-conjugated radical polymer film has a thickness of 0.1-0.6 µm, and the non-conjugated radical polymer film has an electrical conductivity of 0.5-30.0 S·m$^{-1}$.

4. A method of making the non-conjugated radical polymer film of claim 1, comprising:
   a) preparing a film of the non-conjugated radical polymer; and
   b) annealing the film prepared in step a) at a temperature that is capable of providing the film with electrical conductivity of 0.1-100.0 S·m$^{-1}$.

5. The method of claim 4, wherein the annealing is carried out at a temperature between 70-90° C. when the polymer is poly(4-glycidyloxy-2,2,6,6-tetramethylpiperidine-1-oxyl) (PTEO).

6. The method of claim 5, wherein the annealing is carried out at a temperature between 75-85° C. when the polymer is poly(4-glycidyloxy-2,2,6,6-tetramethylpiperidine-1-oxyl) (PTEO).

7. The non-conjugated radical polymer film of claim 1, wherein the film is prepared by a method comprising:
   a) preparing a film of the non-conjugated radical polymer; and
   b) annealing the film prepared in step a) at a temperature that is capable of providing the film with electrical conductivity of 0.1-100.0 S·m$^{-1}$.

8. The non-conjugated radical polymer film of claim 7, wherein the annealing is carried out at a temperature between 75-85° C.

* * * * *